Nov. 16, 1926.
W. W. McMAHAN
AIR BAG
Filed May 8, 1925
1,607,356
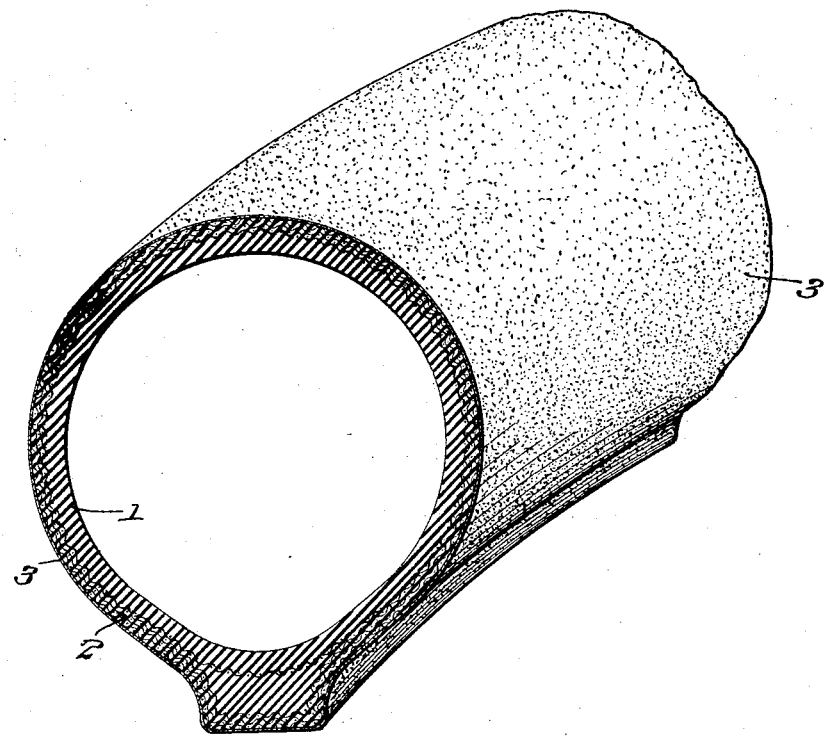
INVENTOR
William W. McMahan
BY [signature]
his ATTORNEYS Patented Nov. 16, 1926.

1,607,356

UNITED STATES PATENT OFFICE.

WILLIAM W. McMAHAN, OF MORRISVILLE, PENNSYLVANIA, ASSIGNOR TO AJAX RUBBER COMPANY, INC., OF NEW YORK, N. Y., A CORPORATION OF NEW YORK.

AIR BAG.

Application filed May 8, 1925. Serial No. 28,817.

This invention relates to an improved air bag for use in vulcanizing pneumatic tires, and has for an object to provide an article of this character which is calculated to survive a longer period of use than air bags previously known.

Another object consists in providing such an article which has its exterior surface composed of a yielding and readily expansible and contractible material, whereby an improved finish is provided the interior of the tire vulcanized on the air bag, and the prevention of cracking or other roughening of the exterior surface of the air bag is promoted.

Another object consists in providing certain improvements in the form, material, construction and arrangement of the several parts of the article whereby the above named, and other objects, may effectively be attained.

A practical embodiment of the invention is represented in the accompanying drawing which shows a detail perspective view of a completed air bag according to my invention.

In the commercial processes of vulcanizing pneumatic tires and, more particularly, the so-called outer casings or shoes of pneumatic vehicle tires, it is quite customary to insert within the formed but unvulcanized tire an inflatable tube, which is commonly called an air bag. The tire and air bag are then placed in a metallic mold which is composed of parts adapted to be suitably secured together, and which has its inner surface of the size and shape desired to be imparted to the tire, as well as provided with suitable engraving for forming upon the finished tire any non-skid surface and suitable lettering. The members of the mold are locked or fastened together, and the air bag is inflated through a suitable valve, similar to the ordinary tire valve. This inflation of the air bag, which may be accomplished by air, water, or any other suitable fluid, causes it to expand and force the uncured tire firmly into contact with the interior of the mold. In this condition the assembly of air bag, tire and mold is placed in a suitable vulcanizer and subjected to heat for the purpose of vulcanizing or curing. Thereafter the assembly may be removed from the vulcanizer, the air bag deflated, the mold taken apart, and the tire removed in an obvious manner.

From this brief description it will be seen that the air bag, is, in fact, one member of the molding apparatus, and it is intended to be used over and over again. These air bags are somewhat expensive to manufacture so that their length of service is a matter of importance. It has been found that the rubber or hard fabric that customarily covers or constitutes the outer surface of the air bags in common use, has a tendency to crack, or otherwise become rough, through service, and this not only shortens the life of the air bag but it has the more important effect of injuring the interior of the tire that is cured by the use of the air bag. This roughness on the exterior surface of the air bag naturally causes corresponding roughness on the interior of the vulcanized tire, and such roughness on the tire frequently causes abrasion and puncture of the inner tube that is used in the tire when the same is put in service on a vehicle.

With these known disadvantages in mind, my invention contemplates preventing injury to the interior of the tire as well as increasing the length of service of the air bag and thereby decreasing cost of manufacture.

Referring to the drawing, it will be seen that the air bag is composed of two main portions, the inner of which consists primarily of rubber while the outer consists mainly of fabric. The rubber portion is denoted by 1 and the fabric portion by 2. The fabric portion may consist of the ordinary duck or woven fabric that is commonly employed in the manufacture of pneumatic tires, or it may consist of the so-called cord fabric that is also in very large use for the same purpose; or it may consist of any other fabric suitable for the purpose.

Such fabric is commonly rubberized or impregnated with rubber by being passed through the usual calender, and it may also be skim coated by suitable operations well understood by all operatives in this industry.

The said rubber and fabric portions may be built up on a pole or mandrel just as the inner tubes for vehicle tires are commonly built up, or the said portions may be built on a drum and expanded to shape; both of which operations are thoroughly well known and understood in this art. Any other suitable method of building up these main components of the air bag into the desired form may be followed, if desired.

After the said portions have been built up, for instance, on a pole, a sheet of yielding material having the capacity of expanding and contracting, to a marked degree, is placed upon the outer surface of the built-up air bag. For this purpose I prefer to employ a matted or non-woven fibrous material such as felt. Wool felt, cotton felt, or other felt, may be used; but I prefer the wool felt, as it seems to be more durable, and to have the capacity for expanding and contracting to a higher degree than the others.

A sheet of suitable felt is preferably rubberized by being passed through the calender, and one surface thereof is preferably skim coated with a very sticky rubber composition. The said sheet, suitably coated, is applied to the built-up air bag with the skim coated side against the bag. This application may be made by spiral wrapping of a ribbon or strip of the felt around the air bag, or by stretching a sheet of the felt and causing it to conform to the exterior of the air bag. In the drawing this felt layer is marked 3. I have found that felt of about one-eighth inch in thickness is entirely satisfactory for this purpose.

Thereupon the air bag is provided with a suitable valve in the well-known manner in which such valves are built into inner tubes for pneumatic tires.

This completes the building up or construction of the air bag, and the same is then placed in a metallic mold, the parts of which are suitably secured together, after which the air bag is inflated through its valve so as to cause it to engage the interior of the mold. The assembly is then placed in a vulcanizer and the air bag vulcanized or cured. It is then removed from the mold and is ready for use in the manner previously described.

The vulcanization of the air bag causes the felt, or the like, to be intimately associated and united with the other parts, and this provides a soft or yielding and readily expansible and contractible surface which is not only durable to an enhanced degree but which is not prone to cracking or otherwise becoming rough. In use it provides the interiors of the tires vulcanized thereon with smooth and even surfaces, free of abrasions or rough spots, and thereby materially improves the product.

It will be understood that various changes may be resorted to in the form, material, construction and arrangement of the several parts without departing from the spirit and scope of my invention; and hence I do not intend to be limited to the details herein shown and described, except as they may be included in the claims.

What I claim is:

1. An air bag for use in vulcanizing tires, the exterior surface of which includes a matted fibrous material.

2. An air bag for use in vulcanizing tires, the exterior surface of which includes a non-woven fibrous material.

3. An air bag for use in vulcanizing tires, the exterior surface of which includes felt.

4. An air bag for use in vulcanizing tires, the exterior surface of which includes wool felt.

5. An air bag for use in vulcanizing tires, the exterior surface of which includes a matted fibrous material vulcanized to the remainder.

6. An air bag for use in vulcanizing tires, the exterior surface of which includes a non-woven fibrous material vulcanized to the remainder.

7. An air bag for use in vulcanizing tires, the exterior surface of which includes felt vulcanized to the remainder.

8. An air bag for use in vulcanizing tires, the exterior surface of which includes wool felt vulcanized to the remainder.

In testimony, that I claim the foregoing as my invention, I have signed my name this 5th day of May 1925.

WILLIAM W. McMAHAN.